(12) United States Patent
Jerrard-Dunne

(10) Patent No.: US 11,907,193 B2
(45) Date of Patent: Feb. 20, 2024

(54) STORING A DATA STRUCTURE

(71) Applicant: International Business Machines Corporation, Armonk, NY (US)

(72) Inventor: Stanley Kieran Jerrard-Dunne, Leopardstown (IE)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 17/497,993

(22) Filed: Oct. 11, 2021

(65) Prior Publication Data

US 2023/0110803 A1 Apr. 13, 2023

(51) Int. Cl.
*G06F 16/00* (2019.01)
*G06F 16/22* (2019.01)
*G06F 16/23* (2019.01)

(52) U.S. Cl.
CPC ...... *G06F 16/2255* (2019.01); *G06F 16/2379* (2019.01)

(58) Field of Classification Search
None
See application file for complete search history.

(56) References Cited

U.S. PATENT DOCUMENTS

| 9,077,681 | B2 | 7/2015 | Mickens | |
| 9,355,116 | B2* | 5/2016 | Calkowski | G06F 16/178 |
| 2009/0313248 | A1* | 12/2009 | Balachandran | H03M 7/3084 |
| 2012/0089579 | A1* | 4/2012 | Ranade | G06F 16/183 |
| | | | | 707/693 |
| 2012/0208636 | A1 | 8/2012 | Feige | |
| 2014/0215001 | A1 | 7/2014 | Tucek | |
| 2015/0293817 | A1* | 10/2015 | Subramanian | G06F 16/184 |
| | | | | 707/645 |
| 2021/0157830 | A1* | 5/2021 | Chen | G06F 3/0683 |

FOREIGN PATENT DOCUMENTS

CN 105608142 B 2/2019

OTHER PUBLICATIONS

Mickens, James, "Silo: Exploiting JavaScript and DOM Storage for Faster Page Loads", Microsoft Research, Printed Sep. 20, 2021, 12 pages, <https://www.microsoft.com/en-us/research/wp-content/uploads/2010/06/paper.pdf>.

* cited by examiner

*Primary Examiner* — Anhtai V Tran
(74) *Attorney, Agent, or Firm* — Edward J. Wixted, III

(57) ABSTRACT

In an approach, a processor segments a data structure into a plurality of initial chunks. A processor, for each of the plurality of initial chunks, determines a chunk key based on identifying a sequence of bits within the respective chunk that is unique within the data structure. A processor re-segments the data structure into a plurality of final chunks, wherein divisions correspond to positions of the identified sequences of bits.

20 Claims, 7 Drawing Sheets

STORING A DATA STRUCTURE

BACKGROUND

The present invention relates to the field of data structures, and more specifically, to segmenting a data structure into a plurality of chunks based on identifying a sequence of bits within each chunk that is unique within the data structure.

Many applications are used to edit very large data structures, often larger than hundreds of megabytes. Such data structures may be JavaScript Object Notation (JSON) files, Rich Text Format (RTF) files, or code. For example, modern web based editor applications are used to edit very large data structures. Accordingly, the saving and reloading of data structures during an editing process by these application typically proves to be a time-consuming and computationally expensive process.

SUMMARY

According to one embodiment of the present invention, a computer-implemented method, computer program product, and computer system are provided. A processor segments a data structure into a plurality of initial chunks. A processor, for each of the plurality of initial chunks, determines a chunk key based on identifying a sequence of bits within the respective chunk that is unique within the data structure. A processor re-segments the data structure into a plurality of final chunks, wherein divisions correspond to positions of the identified sequences of bits.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION

Figure 1:
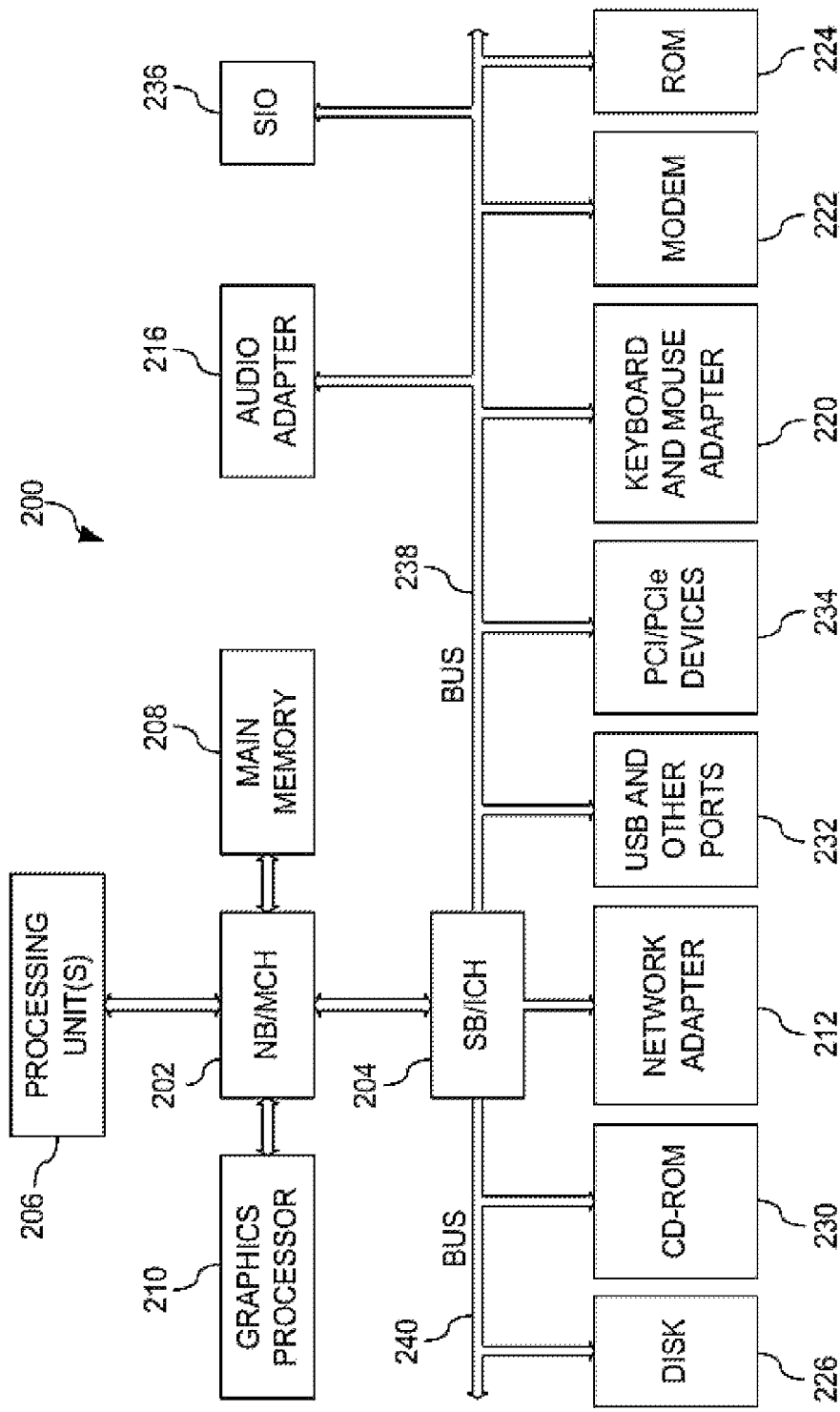
FIG. 1 is a block diagram of an example system in which aspects of the illustrative embodiments may be implemented.

Even when known compression techniques are utilized, there still exists large amounts of data to be sent and received, both as the data structure is opened to be edited and as edits to the data structure are saved. Thus, there exists a need for an approach for storing and loading which exhibits a lower volume of data flow.

A possible approach to lower the volume of data is to transmit a record of changes of the data structure when the edited data structure is saved. Thus, only the record of changes are sent to memory for saving, where the record of changes may be used to update and store a fully up-to-date data structure. However, embodiments of the present invention recognize that, while such an approach improves the performance for saving data structures, the approach does not improve performance for opening data structures where the full data structure needs to be retrieved by the application.

Indeed, it may be the case that multiple users have a data structure stored locally. If one user edits the data structure and subsequently updates the data structure in a common storage location (perhaps using a record of changes as described above), then other users need to load the whole data structure from the common storage in order to obtain the most up-to-date data structure.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. If the term "adapted to" is used in the claims or description, it is noted the term "adapted to" is intended to be equivalent to the term "configured to".

In the context of the present application, where embodiments of the present invention constitute a method, it should be understood that such a method may be a process for execution by a computer, i.e., may be a computer-implementable method. The various steps of the method may therefore reflect various parts of a computer program, e.g., various parts of one or more algorithms.

Also, in the context of the present application, a system may be a single device or a collection of distributed devices that are adapted to execute one or more embodiments of the methods of the present invention. For instance, a system may be a personal computer (PC), a server, or a collection of PCs and/or servers connected via a network such as a local area network, the Internet and so on to cooperatively execute at least one embodiment of the methods of the present invention.

Implementations in accordance with the present disclosure relate to various techniques, methods, schemes and/or solutions pertaining to storing a data structure. In particular, the data structure is segmented to produce final chunks of data with corresponding chunk keys. Divisions of the final chunks are selected/configured to correspond to locations of sequences of bits (unique within the data structure for each of a plurality of initial chunks), the chunk keys based upon the identified sequences of bits.

By segmenting the data structure into smaller final chunks, when loading the data structure, only final chunks not stored locally (e.g., in a cache) need to be retrieved. Accordingly, the volume of data which needs to be fetched is reduced, improving performance both in respect of computational complexity and time consumption.

However, merely segmenting a data structure into chunks of fixed sizes can often prove problematic. In particular, when bits of the data structure are appended or removed, not only does the chunk in which the bit is appended or removed need to be updated, but also every subsequent chunk. Thus, whenever the data structure is edited (even in a minor way), many chunks will need updating. This may prove particularly problematic in a situation where many clients store chunks locally for use, as each client will have to re-load many chunks in order to obtain an up-to-date data structure.

Embodiments of the present invention recognize that final chunks and chunk keys produced by way of the present invention may overcome the above problem. Specifically, the data structure is first segmented into a plurality of initial chunks. Each initial chunk is then analyzed to identify a unique sequence of bits. The unique sequence of bits identified within each initial chunk is then used as basis for a chunk key corresponding to each of the initial chunks. The data structure is subsequently re-segmented at positions corresponding to locations of the unique sequences of bits. As a result, an array of chunk keys that identify corresponding final chunks is obtained.

Thus, when bits are added or removed from the data structure during editing, only final chunks corresponding to those added/removed bits are updated. This is because the chunk key corresponds to the start of each final chunk, rather than the final chunks being of a specified length.

Put another way, embodiments of the present invention provide the segmentation of a data structure into a plurality of final chunks, which enables change "deltas" applied to final chunks to minimize the number of changing final chunks. Thus, locally cached of final chunks may then be utilized to reduce the burden of loading the data structure (e.g., by avoiding having to the whole updated data structure over a network).

Further embodiments of the proposed invention provide a computer-implemented method for loading a data structure. The method comprises retrieving a plurality of final chunks and corresponding chunk keys associated with the data structure, wherein divisions of the final chunks correspond to positions of sequences of bits that are unique within the data structure, and wherein the chunk keys are based on the sequences of bits, comparing the chunk keys with a plurality of locally stored chunks to identify chunk keys with no associated locally stored chunks, and loading the final chunks associated with the identified chunk keys.

In this way, only final chunks not stored locally must be loaded, reducing the burden of downloading many final chunks, or perhaps even the whole data structure. This is enabled by the segmentation of the data into final chunks corresponding to chunk keys, where the final chunks are divided at locations corresponding to positions of sequences of bits that are unique within the data structure.

In some embodiments, the method of loading the data structure may further comprise combining the plurality of final chunks to obtain the data structure. In this way, an up-to-date data structure may be acquired.

Turning to other embodiments of the proposed concept(s) for storing the data structure, identifying the sequence of bits may comprise scanning the data structure sequentially from a first bit of the initial chunk to a last bit of the initial chunk in order to identify a sequence of bits within the chunk that is unique within the data structure closest to the first bit.

By scanning the initial chunk from first to last, a unique sequence of bits may be identified as close to the first bit as possible. In this way, the divisions of the data structure yielding the final chunks may be such that they are as close to the size of the initial chunks as possible. This may prove particularly advantageous where chunks of a given size are desirable. In addition, scanning the initial chunk from a first to a last bit may enable the efficient and reliable identification of the sequence of bits unique within the data structure.

In other embodiments, the method of storing the data structure may further comprise receiving a record of changes comprising changes made to the data structure, combining the plurality of final chunks to obtain the data structure, updating the data structure based on the record of changes, and segmenting the updated data structure into a plurality of updated final chunks, wherein divisions correspond to the position of the identified sequence of bits.

As a record of changes is received, rather than a complete updated data structure, there is a reduction of the burden of transmission of data. The record of changes may contain much less data than an updated data structure, particularly when the changes made are relatively minor compared to the size of the data structure. By then combining the record of changes with the original data structure, an updated data structure may be obtained in a straightforward manner. Chunk keys already produced can then be re-used in order to deliver final chunks, reducing an overall amount of processing required to segment the updated data structure.

In some embodiments, the method of storing the data structure may further comprise, for each of the plurality of final chunks, determining whether a size of the final chunk is greater than a predetermined upper threshold value, and responsive to determining that the size of the final chunk is greater than the predetermined upper threshold value, segmenting the final chunk.

By effectively setting an upper threshold for the size of each of the final chunks, chunks which are so large such that benefits of segmentation are reduced may be avoided. This may occur, for example, when the identified (unique) sequence of bits for a first chunk is near to the first bit of the chunk, and the identified (unique) sequence of bits for a second sequential chunk is near the last bit of the chunk. As a result, the divisions of the final chunk may be such that the final chunk is very large, and therefore requires further segmentation.

In yet further embodiments, the method of storing the data structure may further comprise, for each of the plurality of final chunks, determining whether a size of the final chunk is less than a predetermined lower threshold value, and responsive to determining that the size of the final chunk is less than the predetermined upper threshold value, combining the final chunk with an adjacent final chunk.

Similarly to setting an upper threshold, by setting a lower threshold, chunks which are so small such that benefits of segmentation are reduced may be avoided. By combining adjacent chunks, a chunk with a more appropriate size may be obtained.

In additional embodiments, the approach of storing the data structure may further comprise, for each of the plurality of final chunks, calculating a hash of the data of the final chunk, and appending the hash and a separator to the chunk key corresponding to the final chunk.

Thus, the hash may identify the final chunk to which the chunk key corresponds.

In some embodiments, the approach of storing the data structure further comprises compressing each of the plurality of final chunks, and storing the plurality of compressed final chunks and associated chunk keys on a server.

By compressing the data structure, as well as segmenting the data structure into chunks, more efficient data storage and transfer may be achieved.

In further embodiments, the data structure is a JavaScript Object Notation (JSON) data structure, a rich text format (RTF) file, or a code file.

JSON data structures tend to be large data structures which are problematic to transfer, especially when many saves, loads and reloads are required. While JSON data structures are easy to understand and convenient to use, they are often not space efficient, with even small objects requiring many bytes to represent. Thus, by implementing the method of storing the JSON data structure by segmenting the JSON data structure, efficient storage and transfer of the JSON data structure may be achieved.

Indeed, the method may be extended to any data structure which is uncompressed. For example, a RTF file or a code file may benefit from storing in the above described manner/

By way of further explanation, given a very large data structure (e.g. a 100 MB long string), it may be advantageous to divide the string into manageable chunks (e.g. 10 MB each). A simple solution may be to simply split the 100 MB string into 10 MB chunks. However, this would mean that inserting or deleting any number of bits anywhere within the 100 MB string leads to a change in every chunk from those bits forward. As a result, a chunking mechanism which may yield chunks close to a desired length (e.g. 10 MB), but at the same time minimize the number of chunks that change as a result of insertions or deletions is desirable.

According to embodiments of the present invention, this segmentation may be achieved by the following steps:
(i) Split the data structure into (regularly sized) initial chunks;
(ii) For each initial chunk, scanning from left to right, find a unique sequence of bits (e.g., a unique 20 byte sequence) that does not occur in any previous initial chunk;
(iii) Add each of the identified unique sequence of bits to an array of chunk keys;
(iv) Re-split the initial data structure at positions corresponding to positions of the identified chunk keys, in order to obtain final chunks;
(v) If any resulting final chunk is smaller than a threshold minimum size, append it to the prior final chunk and discard the corresponding chunk key;
(vi) If any resulting final chunk is larger than a threshold maximum size, split that final chunk using the same mechanism as steps (i)-(iv); and
(vii) For each chunk key, append a separator and a hash of the chunk data of the final chunk corresponding to the chunk key. For example, MD5 or secure hash algorithm (SHA) hash may be used.

The result of the above segmentation process is an array of chunk keys and corresponding final chunks of data. Final data chunks may be cached locally on a browser using the chunk hash as a cache key. Indeed, in modern WEB development applications there often exists support for asynchronous storage that may be utilized to store the locally cached data chunks.

By segmenting the data structure in the above manner, the final chunks and chunk keys may be used in the below described manner.

In initially saving the data, all final chunks may be compressed and sent to a server with corresponding chunk keys. The server may save the final chunks in its associated database. The server may also save the chunk keys. When subsequently loading the data, a client may retrieve the chunk keys from the server. For each final chunk the client may first check the local cache (and if available uses it). If the final chunk is not available in the local cache, then the client may retrieve that final chunk from the server and add it to the cache. The client may then decompress and combine the final chunks in order to obtain the complete data structure.

Furthermore, when saving edits to the data structure, the client may compute a record of changes between the initial data structure and the updated version of the data structure, and subsequently transmit the record of changes to the server. The server may then be capable of reconstructing the initial data structure by combining the stored final chunks, and then applies the record of changes to acquire the updated data structure. The server may then segment the updated data structure using the existing chunk keys, and saves the resulting updated final chunks. In other words, the server may segment the updated data structure according to steps (iv)-(vii) described above.

Thus, this results in a set of updated final chunks, some of which match between the previous final chunks (depending on the scope of the change). This facilitates clients only needing to load final chunks from the server which have been updated, and not the final chunks which have not been modified. For example, an insertion at the beginning of the data structure will affect only the first final chunk, and all other final chunks will remain the same. Ultimately, this reduces the volume of data transfer required to obtain an up-to-date data structure both when saving to the server, and when loading by the client.

Turning now to FIG. 1, there is presented a block diagram of an example system 200 in which aspects of the illustrative embodiments may be implemented. The system 200 is an example of a computer, such as client in a distributed processing system, in which computer usable code or instructions implementing the processes for illustrative embodiments of the present invention may be located. For instance, the system 200 may be configured to implement a data manipulation unit and a chunk key generation unit according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java® programming system, may run in conjunction with the operating system and provides calls to the operating system from Java® programs or applications executing on system 200. Java and all Java-based trademarks and logos are trademarks or registered trademarks of Oracle and/or its affiliates.

As a server, system 200 may be, for example, an IBM® eServer™ System p computer system, running the Advanced Interactive Executive (AIX®) operating system or the Linux® operating system. The system 200 may be a symmetric multiprocessor (SMP) system including a plurality of processors in processing unit 206. Alternatively, a single processor system may be employed. IBM, eServer and AIX are trademarks of International Business Machines Corporation in the United States and/or other countries. The registered trademark Linux® is used pursuant to a sublicense from the Linux Foundation, the exclusive licensee of Linus Torvalds, owner of the mark on a world-wide basis.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

Figure 2:
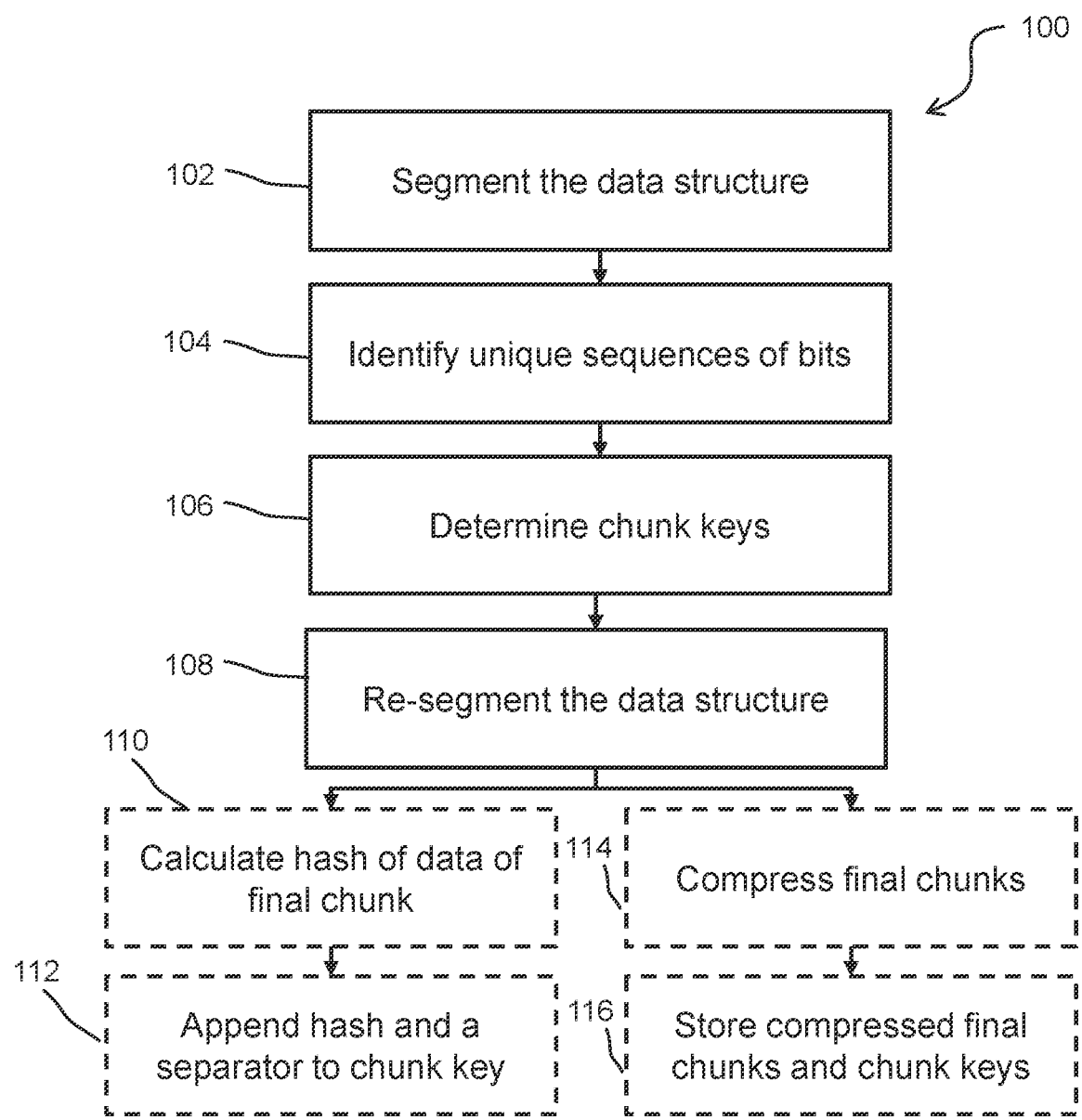
FIG. 2 is a flow diagram of an approach for storing a data structure according to an embodiment.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 1, may include one or more devices used to transmit and receive data. A memory may be, for example, main memory 208, ROM 224, or a cache such as found in NB/MCH 202 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Referring now to FIG. 2, there is presented a flow diagram 100 of an approach for storing a data structure according to an exemplary embodiment.

At step 102, a processor segments the data structure into a plurality of initial chunks. The segmentation may be performed at regular intervals, such that the data structure is split into regular chunks (such as 10 MB), or may be individually selected. The size of the chunks may be set at a predetermined value, or may be selected by a user.

The data structure may be any data structure where insertion or removal of data does not cause a change to the data structure at points prior to, or after, the insertion/deletion. For example, the data structure may be an uncompressed JSON data structure, a code file, or a text file. However, the data structure may not be a .doc file.

At step 104, for each of the plurality of initial chunks, a processor identifies a sequence of bits within the chunk that is unique within the data structure. The sequence of bits may be set to a predetermined length (such as 20 Bytes).

It may be the case that identifying the sequence of bits comprises scanning the data structure sequentially from a first bit of the initial chunk to a last bit of the initial chunk in order to identify a sequence of bits within the chunk that is unique within the data structure closest to the first bit. However, alternative methods of search for (unique) sequence of bits may be utilized. It may be the case that the sequence of bits are merely a sequence of bits which do not occur in any previous chunk.

At step 106, for each of the plurality of initial chunks, a processor determines a chunk key based on the identified sequence of bits within that initial chunk.

In this way, the chunk key may be used to uniquely identify the chunk of the data structure. The chunk key may simply be the identified sequence of bits, or may be another representation of the identified sequence of bits, such as compressed version of the identified sequence of bits. Finally, the chunk key may be stored in an array of chunk At step 108, a processor re-segments the data structure into a plurality of final chunks, wherein divisions correspond to positions of the identified sequences of bits.

Put another way, a plurality of final chunks of the data structure are obtained, each having a corresponding chunk key. When data is inserted or removed from any individual final chunk, the other final chunks are not altered. As a result, when editing, altering or otherwise changing the data structure, it may be the case that only some of the final chunks are changed. This ultimately has the effect that when downloading an updated version of the data structure to a client which has an older version of the data structure stored locally, only those chunks which have been altered need to be downloaded.

In some embodiments, the approach 100 may further include steps 110-112, and/or steps 114-116.

At step 110, for each of the plurality of final chunks, a processor calculates a hash of the data of the final chunk. For example, the hash of the data may be the MD5 hash of the data, an SHA hash of the data, or any known hashing technique.

At step 112, for each of the plurality of final chunks, a processor appends the calculated hash and a separator to the chunk key corresponding to the final chunk.

Thus, an array of chunk keys may be obtained with a hash of the final chunk data. This information may be cached locally. In web development applications, this information may be cached locally on the browser.

At step 114, a processor compresses each of the plurality of final chunks. The final chunks may be individually compressed, improving the speed and efficiency of transmission and storage. For example, the final chunks may be compressed using LZW compression, or other known compression techniques.

At step 116, a processor stores the plurality of compressed final chunks and associated chunk keys are stored. In other words, the plurality of compressed final chunks and chunk keys may be stored in a commonly accessible server for use by many clients. In this way, the data structure may be loaded by clients when required. Updates may be sent to the server, and the clients may then access the up-to-date data structure (by fetching updated final chunks) from the server.

Figure 3A:
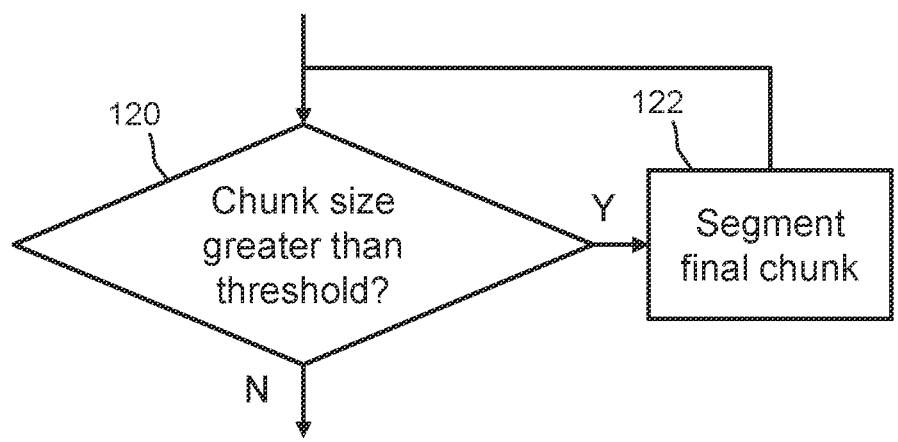
FIGS. 3A and 3B are flow diagrams of approaches for further processing final chunks according to an aspect of an embodiment.
Figure 3B:
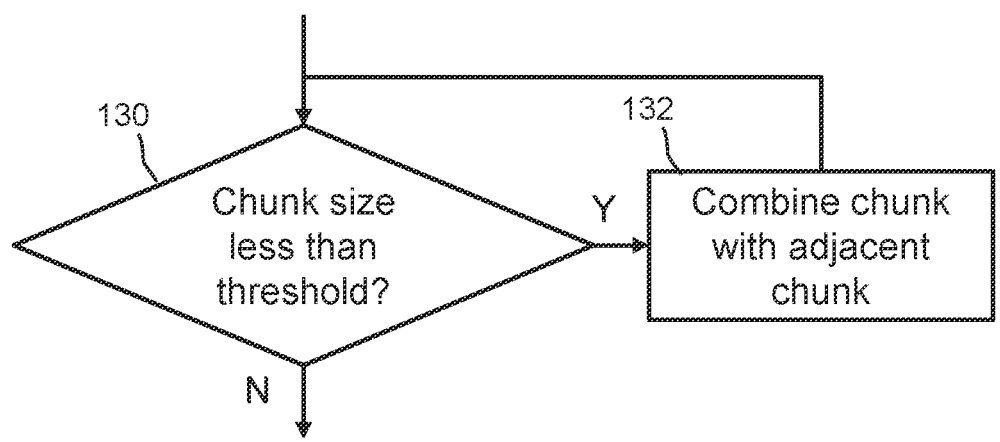

FIGS. 3A and 3B present flow diagrams of approaches for further processing final chunks according to an aspect of an exemplary embodiment. Both approaches are directed towards delivering final chunks of a desired size. More specifically, FIG. 3A ensures each final chunk does not exceed a predetermined upper threshold value, and FIG. 3B ensures each final chunk meets at least a predetermined lower threshold value.

At step 120, a processor determines whether a size of the final chunk is greater than a predetermined upper threshold value. Upon determining that the size of the final chunk is not greater than the predetermined upper threshold value, the method terminates.

At step 122, responsive to determining that the size of the final chunk is greater than the predetermined upper threshold value, a processor segments the final chunk. The final chunk may be segmented using the approach described in relation to FIG. 2, producing multiple sub-final chunks with corresponding chunk keys.

Accordingly, final chunks which are excessively large, such that the benefits associated with segmenting the data structure into chunks are suppressed/lost.

At step 130, a processor determines whether a size of the final chunk is less than a predetermined lower threshold value. Upon determining that the size of the final chunk is not less than the predetermined lower threshold value, the approach terminates.

At step 132, responsive to determining that the size of the final chunk is less than the predetermined upper threshold value, a processor combines the final chunk with an adjacent final chunk. In some embodiments, the adjacent final chunk may be the previous final chunk. In this case, the chunk key associated with the final chunk which has been determined as too small may be discarded. For final chunks which are excessively small, the burden due increased complexity in recombining and individual transmission outweighs the benefits associated with segmenting the data structure into chunks.

Figure 4:
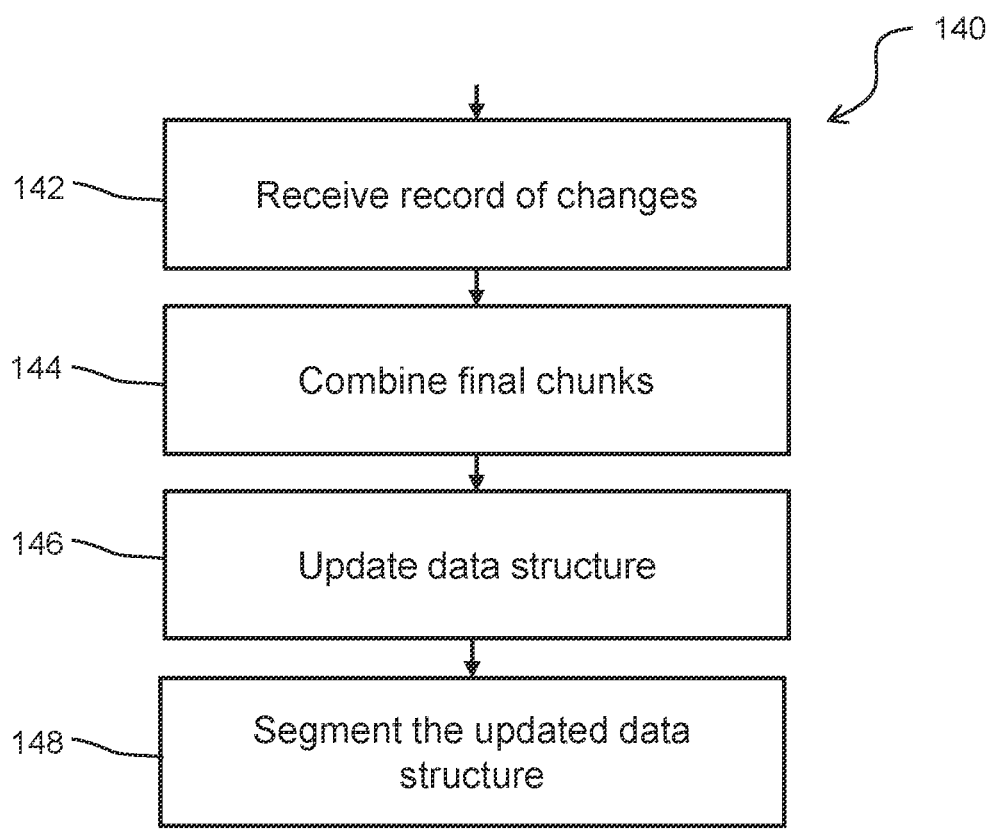
FIG. 4 is a flow diagram of an approach for updating a data structure according to an aspect of an embodiment.

Turning now to FIG. 4, there is shown a flow diagram of an approach 140 for updating (editing) the data structure according to an aspect of the exemplary embodiment.

At step 142, a processor receives a record of changes comprising changes made to the data structure. The record of changes may include bits to be added and their corresponding insertion positions, bits to be deleted and their corresponding positions, and bits to be altered and their corresponding positions.

In this way, the computational and bandwidth demand of transmitting a fully updated data structure is avoided by only transmitting changes. This may be particularly beneficial when the number of changes made to the data structure is small. However, this requires an older version of the data structure to be available at the receiver.

At step 144, a processor combines the plurality of final chunks in order to obtain the data structure. Put another way, an older version of the data structure is acquired by joining stored final chunks together. This may require decompression of the final chunks.

At step 146, a processor updates the data structure based on the record of changes.

The record of changes may provide a straightforward list of updates made to the data structure. Therefore, bits are added to or removed from the data structure, and bits may be altered. This delivers a fully up-to-date data structure from the previous data structure.

At step 148, a processor segments the updated data structure into a plurality of updated final chunks, wherein divisions correspond to the positions of the identified sequences of bits.

As the updated data structure is re-segmented according to positions of the previously identified sequences of bits (reflected in the chunk keys), final chunks may be acquired which are updated (because they contain added, removed and/or updated bits). Unchanged final chunks may also be obtained, as they do not contain added, removed, and/or updated bits. Thus, when a client having the previous version of the data structure attempts to load the updated data structure, it may only be necessary to load those final chunks which have changed.

Figure 5:
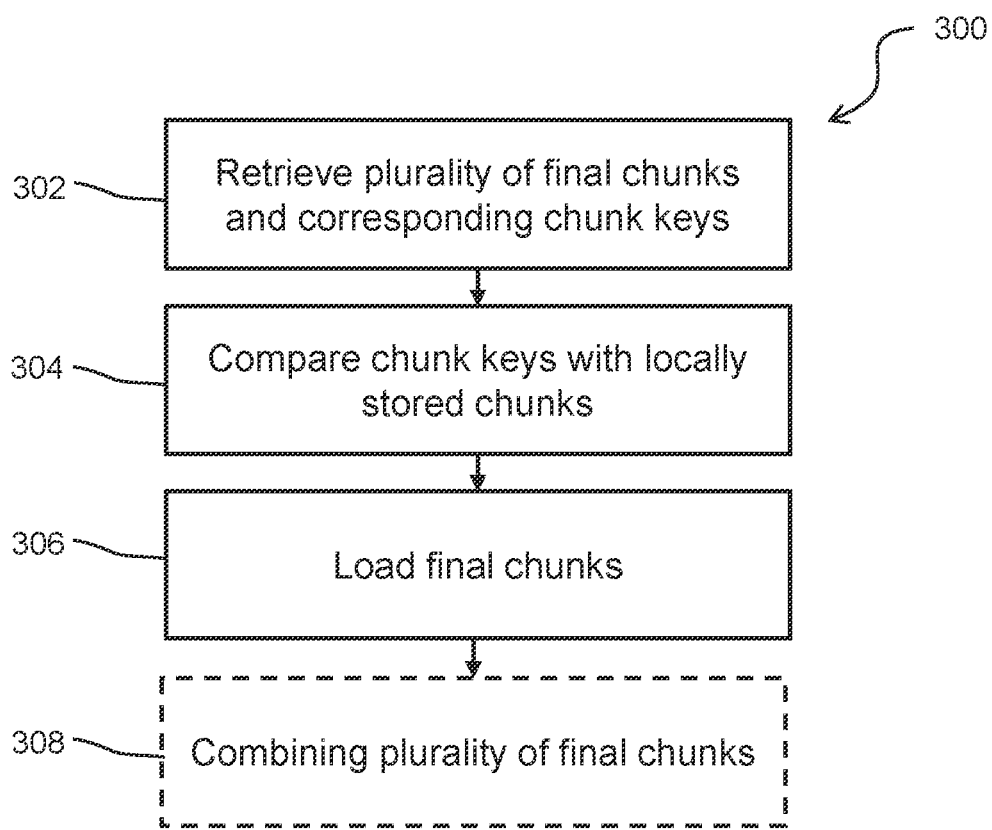
FIG. 5 is a flow diagram of an approach for loading a data structure according to another embodiment.

FIG. 5 presents a flow diagram of an approach 300 for loading a data structure according to another exemplary embodiment.

At step 302, a processor retrieves a plurality of final chunks and corresponding chunk keys associated with the data structure. Divisions of the final chunks correspond to positions of sequences of bits that are unique within the data structure, and the chunk keys are based on the sequences of bits. In other words, the data structure is stored according to any of the methods described in relation to FIGS. 2-4.

At step 304, a processor compares the chunk keys with a plurality of locally stored chunks to identify chunk keys with no associated locally stored chunks.

Put another way, the locally stored chunks may correspond to a previous version of the data structure. If there are chunk keys with no associated locally stored chunks, this implies that the locally stored data structure is a previous version. The identified chunk keys indicate which final chunks need to be loaded in order to acquire an up-to-date version of the data structure.

At step 306, a processor loads the final chunks associated with the identified chunk keys.

In this way, loading of the whole data structure may be avoided, thus reducing the volume of the flow of data through whichever network this method of storing and loading a data structure is applied.

Some embodiments of the approach 300 may further include step 308. At step 308, a processor combines the plurality of final chunks in order to obtain the data structure.

Accordingly, a fully updated data structure may be loaded while minimizing the amount of data flowing through the system for storing, loading, and updating the data structure.

Figure 6:
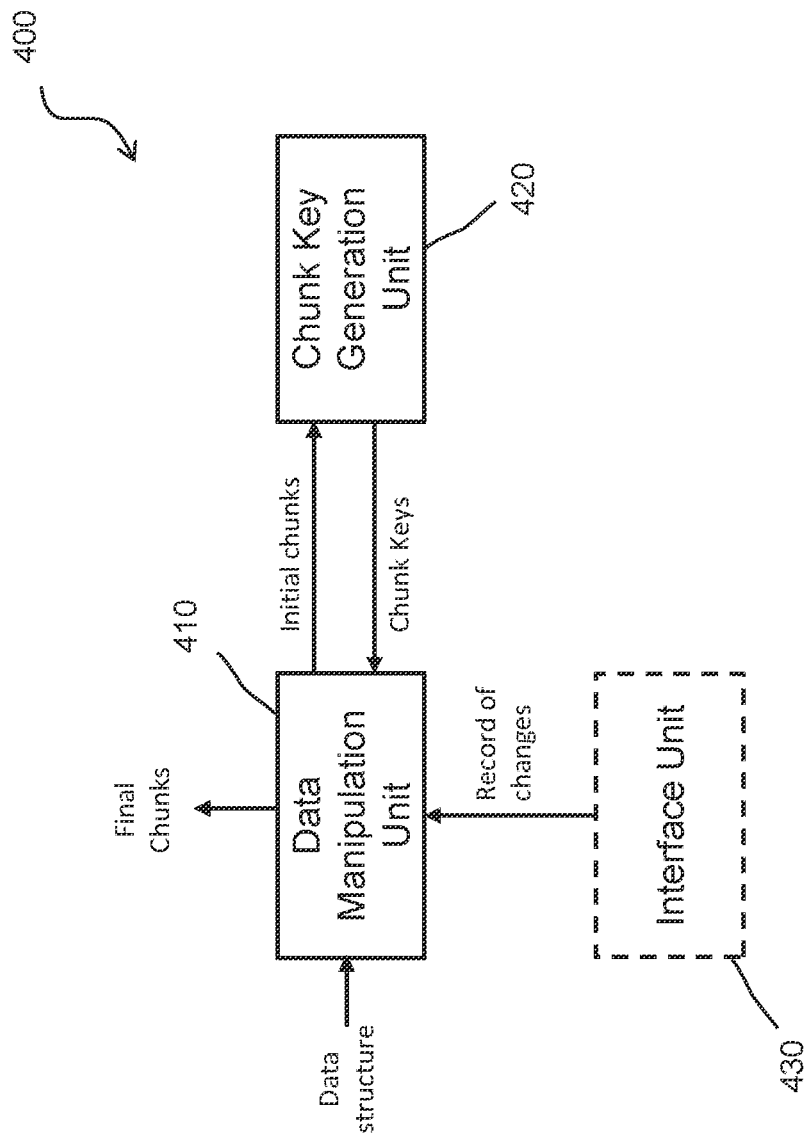
FIG. 6 is a block diagram of an embodiment of a system for storing a data structure.

Referring now to FIG. 6, there is depicted a simplified block diagram of a system 400 for storing a data structure. The system 400 includes at least a data manipulation unit 410 and a chunk key generation unit 420. Optionally, the system 400 may include an interface unit 430.

Firstly, the data manipulation unit 410 is configured to segment the data structure into a plurality of initial chunks. The chunk key generation unit 420 is configured to (for each of the plurality of initial chunks) determine a chunk key based on identifying a sequence of bits within the chunk that is unique within the data structure.

Further, the data manipulation unit 410 is configured to re-segment the data structure into a plurality of final chunks, wherein divisions correspond to a position of the identified sequence of bits.

In some embodiments, the chunk key generation unit 420 is configured to identify the sequence of bits by scanning the data structure sequentially from a first bit of the initial chunk to a last bit of the initial chunk in order to identify a sequence of bits within the chunk that is unique within the data structure closest to the first bit.

Furthermore, the system 400 may further comprise an interface unit 430. The interface unit 430 may be configured to receive a record of changes comprising changes made to the data structure. In this case, the data manipulation unit 410 is further configured to combine the plurality of final chunks to obtain the data structure, update the data structure based on the record of changes, and segment the updated data structure into a plurality of updated final chunks, wherein divisions correspond to the position of the identified sequence of bits.

Figure 7:
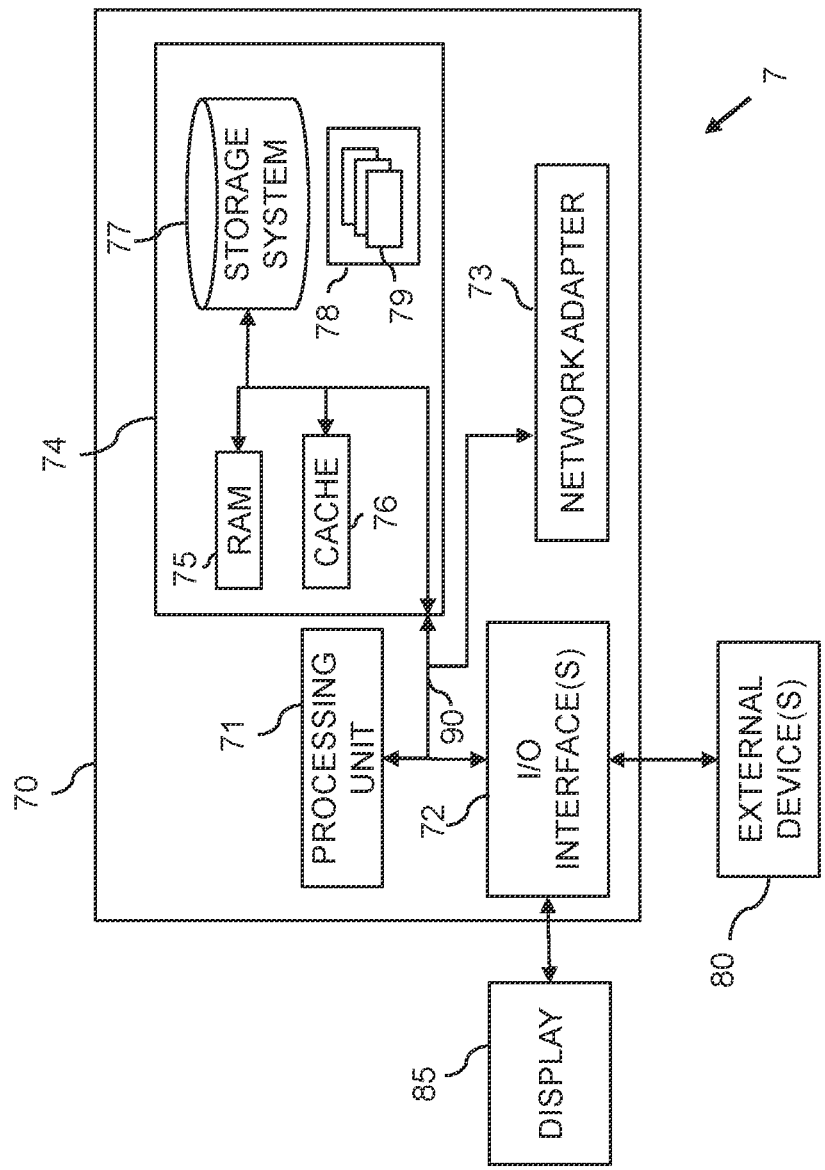
FIG. 7 is a simplified block diagram of a computer system on which the approach for populating a data entry field with data may be executed according to an embodiment.

By way of further example, as illustrated in FIG. 7, embodiments may comprise a computer system 70, which may form part of a networked system 7. For instance, a system for redacting an image to be displayed by a display device may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media 77. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for storing a data structure according to a proposed embodiment.

Program/utility 78, having a set (at least one) of program modules 79, may be stored in memory 74. Program modules 79 generally carry out the functions and/or methodologies of proposed embodiments for detecting a scene transition in video footage.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    segmenting a data structure into a plurality of uniformly sized initial chunks;
    for each of the plurality of initial chunks, determining a single chunk key for the respective initial chunk based on identifying a sequence of bits within the respective initial chunk that is unique within the data structure, wherein the sequence of bits is a subset of bits of the respective chunk;
    adding each chunk key to an array of chunk keys; and
    re-segmenting the data structure into a plurality of non-uniformly sized final chunks, wherein divisions of each final chunk correspond to positions of the identified sequences of bits.

2. The computer-implemented method of claim 1, wherein identifying the sequence of bits comprises scanning the data structure sequentially from a first bit of the respective initial chunk to a last bit of the respective initial chunk to identify a sequence of bits within the respective initial chunk that is unique within the data structure and closest to the first bit.

3. The computer-implemented method of claim 1, further comprising:
    receiving a record of changes comprising changes made to the data structure;
    combining the plurality of final chunks to obtain the data structure;
    updating the data structure based on the record of changes; and
    segmenting the updated data structure into a plurality of updated final chunks, wherein divisions correspond to the positions of the identified sequences of bits.

4. The computer-implemented method of claim 1, further comprising:
    for each of the plurality of final chunks, determining that a size of the respective final chunk is greater than a predetermined upper threshold value; and
    responsive to determining that the size of the respective final chunk is greater than the predetermined upper threshold value, segmenting the respective final chunk into a plurality of chunks.

5. The computer-implemented method of claim 1, further comprising:
    for each of the plurality of final chunks, determining that a size of the respective final chunk is less than a predetermined lower threshold value; and
    responsive to determining that the size of the respective final chunk is less than the predetermined upper threshold value, combining the respective final chunk with an adjacent final chunk.

6. The computer-implemented method of claim 1, further comprising, for each of the plurality of final chunks:
    calculating a hash of the data of the respective final chunk; and
    appending the hash and a separator to the chunk key corresponding to the respective final chunk.

7. The computer-implemented method of claim 1, further comprising:
compressing each of the plurality of final chunks; and
storing the plurality of compressed final chunks and associated chunk keys on a server.

8. The computer-implemented method of claim 1, wherein the data structure is of a selection from the group consisting of: a JavaScript Object Notation (JSON) data structure and a rich text format (RTF) file.

9. The computer-implemented method of claim 1, further comprising:
comparing the chunk keys with a plurality of locally stored chunks to identify chunk keys with no associated locally stored chunks; and
loading the respective final chunks associated with the identified chunk keys.

10. The computer-implemented method of claim 1, further comprising combining the plurality of final chunks to obtain the data structure.

11. The computer-implemented method of claim 1, further comprising:
retrieving the plurality of final chunks and corresponding chunk keys associated with the data structure, wherein:
divisions of the final chunks correspond to positions of sequences of bits that are unique within the data structure; and
the chunk keys are based on the sequences of bits;
comparing the chunk keys with a plurality of locally stored chunks to identify chunk keys with no associated locally stored chunks; and
loading the final chunks associated with the identified chunk keys.

12. The computer-implemented method of claim 1, wherein each chunk key is selected from the group consisting of: the respective identified sequence of bits and a compressed version of the identified sequence of bits.

13. A computer program product comprising:
one or more computer readable storage media, and program instructions collectively stored on the one or more computer readable storage media, the program instructions comprising:
program instructions to segment a data structure into a plurality of uniformly sized initial chunks;
program instructions to, for each of the plurality of initial chunks, determine a single chunk key for the respective initial chunk based on identifying a sequence of bits within the respective initial chunk that is unique within the data structure, wherein the sequence of bits is a subset of bits of the respective chunk;
program instructions to add each chunk key to an array of chunk keys; and
program instructions to re-segment the data structure into a plurality of non-uniformly sized final chunks, wherein divisions of each final chunk correspond to positions of the identified sequences of bits.

14. The computer program product of claim 13, wherein program instructions to identify the sequence of bits comprises scanning the data structure sequentially from a first bit of the respective initial chunk to a last bit of the respective initial chunk to identify a sequence of bits within the respective initial chunk that is unique within the data structure and closest to the first bit.

15. The computer program product of claim 13, further comprising:
program instructions, collectively stored on the one or more computer readable storage media, to receive a record of changes comprising changes made to the data structure;
program instructions, collectively stored on the one or more computer readable storage media, to combine the plurality of final chunks to obtain the data structure;
program instructions, collectively stored on the one or more computer readable storage media, to update the data structure based on the record of changes; and
program instructions, collectively stored on the one or more computer readable storage media, to segment the updated data structure into a plurality of updated final chunks, wherein divisions correspond to the positions of the identified sequences of bits.

16. The computer program product of claim 13, further comprising:
program instructions, collectively stored on the one or more computer readable storage media, to, for each of the plurality of final chunks, determine that a size of the respective final chunk is greater than a predetermined upper threshold value; and
program instructions, collectively stored on the one or more computer readable storage media, to, responsive to determining that the size of the respective final chunk is greater than the predetermined upper threshold value, segment the respective final chunk into a plurality of chunks.

17. The computer program product of claim 13, further comprising:
program instructions, collectively stored on the one or more computer readable storage media, to, for each of the plurality of final chunks, determine that a size of the respective final chunk is less than a predetermined lower threshold value; and
program instructions, collectively stored on the one or more computer readable storage media, to, responsive to determining that the size of the respective final chunk is less than the predetermined upper threshold value, combine the respective final chunk with an adjacent final chunk.

18. The computer program product of claim 13, further comprising program instructions, collectively stored on the one or more computer readable storage media, to, for each of the plurality of final chunks:
calculate a hash of the data of the respective final chunk; and
append the hash and a separator to the chunk key corresponding to the respective final chunk.

19. The computer program product of claim 13, further comprising:
program instructions, collectively stored on the one or more computer readable storage media, to compress each of the plurality of final chunks; and
program instructions, collectively stored on the one or more computer readable storage media, to store the plurality of compressed final chunks and associated chunk keys on a server.

20. A computer system comprising:
one or more computer processors, one or more computer readable storage media, and program instructions collectively stored on the one or more computer readable storage media for execution by at least one of the one or more computer processors, the program instructions comprising:
program instructions to segment a data structure into a plurality of uniformly sized initial chunks;

program instructions to, for each of the plurality of initial chunks, determine a single chunk key for the respective initial chunk based on identifying a sequence of bits within the respective initial chunk that is unique within the data structure, wherein the sequence of bits is a subset of bits of the respective chunk;

program instructions to add each chunk key to an array of chunk keys; and program instructions to re-segment the data structure into a plurality of non-uniformly sized final chunks, wherein divisions of each final chunk correspond to positions of the identified sequences of bits.

* * * * *